United States Patent
Cho et al.

(10) Patent No.: US 11,475,265 B2
(45) Date of Patent: Oct. 18, 2022

(54) NFC QR CODE LABEL FOR PREVENTING FORGERY AND FALSIFICATION AND METHOD FOR PRODUCING NFC QR CODE LABEL

(71) Applicant: RESEARCH & BUSINESS FOUNDATION SUNGKYUNKWAN UNIVERSITY, Suwon-si (KR)

(72) Inventors: Gyou Jin Cho, Suncheon-si (KR); Jun Feng Sun, Suncheon-si (KR); Hye Jin Park, Yangsan-si (KR); Kiran Shrestha, Suncheon-si (KR); Gyan Rajkoirala, Suncheon-si (KR); You Shin Kim, Suncheon-si (KR); Pravesh Yadav, Suncheon-si (KR); Sajjan Parajuli, Suncheon-si (KR); Welsey Prince Vanaraj, Suncheon-si (KR); Amol Marotrao Kale, Suncheon-si (KR); Jinhwa Park, Jeollanam-do (KR); Sunggeun Lee, Suncheon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 17/416,471

(22) PCT Filed: Dec. 19, 2018

(86) PCT No.: PCT/KR2018/016274
§ 371 (c)(1),
(2) Date: Jun. 19, 2021

(87) PCT Pub. No.: WO2020/130188
PCT Pub. Date: Jun. 25, 2020

(65) Prior Publication Data
US 2022/0067473 A1    Mar. 3, 2022

(30) Foreign Application Priority Data

Dec. 19, 2018  (KR) .................. 10-2018-0165590

(51) Int. Cl.
*G06K 19/07* (2006.01)
*B42D 25/378* (2014.01)
(Continued)

(52) U.S. Cl.
CPC ....... *G06K 19/0723* (2013.01); *B42D 25/378* (2014.10); *G02F 1/167* (2013.01); *G06K 19/06037* (2013.01); *G06K 19/07773* (2013.01)

(58) Field of Classification Search
CPC ......... G06K 19/0723; G06K 19/06037; G06K 19/07773; B42D 25/378; G02F 1/167
(Continued)

(56) References Cited

U.S. PATENT DOCUMENTS 8,567,677 B1 * 10/2013 Yap .................... G06K 19/0614
235/454
8,950,684 B1 * 2/2015 Scholes .............. G06K 19/0614
235/494

(Continued)

FOREIGN PATENT DOCUMENTS

| JP | 2017-130878 A | 7/2017 |
|----|---------------|--------|
| KR | 10-2013-0105241 A | 9/2013 |
| KR | 10-2013-0140340 A | 12/2013 |

OTHER PUBLICATIONS

Printing Korea. A Study on the Lithographic Printability of Silicon ink in the Offset Printing. Monthly Printing Korea for Jan. 2015, Retrieved from "http://www.printingkorea.or.kr/bbs/board.php?bo_table=B15&wr_id=187&page=&ckattempt=1".

*Primary Examiner* — Allyson N Trail
(74) *Attorney, Agent, or Firm* — Novick, Kim & Lee, PLLC; Sang Ho Lee; Hyun Woo Shin

(57) ABSTRACT

An NFC QR code label according to the present invention comprises: a rectenna for receiving a radio frequency signal from a terminal device and converting the signal into DC power; a ring oscillator activated by receiving the DC power supplied from the rectenna, and producing an oscillation signal having a predetermined frequency; and a light-emitting QR code flickering in response to the oscillation signal.

(Continued)

The light-emitting QR code includes a QR code pattern formed by means of gravure printing using a nonconductor ink.

16 Claims, 7 Drawing Sheets

(51) Int. Cl.
    *G02F 1/167*     (2019.01)
    *G06K 19/06*     (2006.01)
    *G06K 19/077*     (2006.01)

(58) Field of Classification Search
    USPC .................................................. 235/492, 494
    See application file for complete search history.

(56) References Cited

U.S. PATENT DOCUMENTS

| | | | |
|---|---|---|---|
| 2013/0215004 A1* | 8/2013 | Nordlinder | G06K 19/06037 |
| | | | 345/105 |
| 2017/0174436 A1* | 6/2017 | Aalund | B65B 43/42 |
| 2017/0270261 A1* | 9/2017 | Contolini | G06T 7/74 |
| 2019/0211208 A1* | 7/2019 | Korchev | G02F 1/133512 |

* cited by examiner

NFC QR CODE LABEL FOR PREVENTING FORGERY AND FALSIFICATION AND METHOD FOR PRODUCING NFC QR CODE LABEL

STATEMENT REGARDING SPONSORED RESEARCH OR DEVELOPMENT

This work was partly supported by Institute of Information & communications Technology Planning & Evaluation (IITP) grant funded by the Korea government (MSIT, No. 2018-0-00389, R2R-printed NFC-active QR code label for checking the history of agrofishery products to prevent forged recode using a smart phone) and the National Research Foundation of Korea (NRF) grant funded by the Korea government (MIST, No. 2020R1A5A1019649, Engineering Research Center for Developing R2R Printed Flexible Computer).

TECHNICAL FIELD

The present invention relates to a QR code label for preventing forgery and falsification, and a method of manufacturing the QR code label.

BACKGROUND ART

A QR code (Quick Response Code) is a matrix-type two-dimensional barcode that stores information through a black and white grid pattern. The QR code has an advantage of overcoming the limit of capacity of conventional barcodes and storing a lot of information.

As a large number of users may read QR codes through a camera of a terminal device owing to distribution of mobile terminal devices, the QR codes are widely used in various fields such as manufacturing, distribution, and logistics services. The services are provided to generate payment information by generating a QR code or to issue a transportation ticket as a QR code so that a user himself or herself may use the QR code.

In addition, a consumer may identify information on a product by scanning the QR code attached on the product using a terminal device, and for example, in the case of food, distribution history may be confirmed by scanning the QR code.

DISCLOSURE OF INVENTION

Technical Problem

Therefore, the present invention has been made in view of the above problems, and it is an object of the present invention to provide an NFC QR code label that can improve reliability by providing a light-emitting QR code that flashes according to a preset frequency based on a radio signal of a terminal device or the like in order to compensate for the shortcomings of a QR code that is easy to copy or forge.

In addition, another object of the present invention is to provide an NFC QR code label manufacturing method that can remarkably reduce the manufacturing cost by manufacturing an NFC QR code label through Roll-to-Roll (R2R) or Sheet-to-Sheet (S2S) gravure printing.

Technical Solution

To accomplish the above objects, according to one aspect of the present invention, there is provided an NFC QR code label comprising: a rectenna for receiving a radio frequency signal from a terminal device and converting the signal into DC power a ring oscillator activated by receiving the DC power from the rectenna to generate an oscillation signal of a preset frequency; and a light-emitting QR code that flashes in response to the oscillation signal. Here, the light-emitting QR code includes a QR code pattern formed by gravure printing using a non-conductive ink.

In an embodiment, the light-emitting QR code may further include: a lower electrode positioned under the QR code pattern to receive the oscillation signal; a transparent upper electrode positioned on the QR code pattern to receive the oscillation signal; and a gel electrolyte that fills gaps in the QR code pattern in the same layer as that of the QR code pattern.

In an embodiment, the light-emitting QR code may further include: a lower electrode positioned under the QR code pattern to receive the oscillation signal; and an electrophoretic sheet positioned on the QR code pattern in an area facing the QR code lower electrode to receive the oscillation signal.

In various embodiments, the NFC QR code label may further comprise a logic circuit for generating a forgery and falsification prevention signal by performing a preset logic operation on the oscillation signal received from the ring oscillator, and providing the forgery and falsification prevention signal to the light-emitting QR code.

According to embodiments, the non-conductive ink may include a PDMS or PVDF ink having a viscosity of 800 to 1,000 centipoise (cP).

According to another aspect of the present invention, there is provided an NFC QR code label manufacturing method for printing a rectenna, a ring oscillator, and a light-emitting QR code through an R2R or S2S gravure printing method, the manufacturing method comprising the steps of: printing an antenna pattern included in the rectenna on a flexible substrate; printing a lower electrode pattern including a rectenna lower electrode, a ring oscillator lower electrode, and a QR code lower electrode on the flexible substrate; printing a QR code pattern on the QR code lower electrode using a non-conductive ink; printing a transparent electrode continuously covering the entire QR code pattern; and printing an upper electrode pattern including a rectenna upper electrode and a ring oscillator upper electrode.

In an embodiment, the non-conductive ink used to print the QR code pattern may include PDMS or PVDF ink having a viscosity of 800 to 1,000 centipoise (cP).

The NFC QR code label manufacturing method according to the present invention may further comprise the step of printing a gel electrolyte pattern of an inverse shape of the QR code pattern using a gel-type ink made of PEO having a viscosity of 800 to 1,000 centipoise (cP) and $LiClO_4$—.

In an embodiment, the step of printing a lower electrode pattern may include the step of printing the lower electrode pattern using an electronic ink based on silver nanoparticles or copper particles having a viscosity of 300 to 800 centipoise (cP).

The NFC QR code label manufacturing method according to the present invention may further comprise the step of printing a dielectric layer of a capacitor included in the rectenna and an insulating layer pattern included in transistors included in the ring oscillator using an ink prepared by mixing IGZO particles having a viscosity of 200 to 1,000 centipoise (cP) and polymeric styrene sulfonic acid.

The NFC QR code label manufacturing method according to the present invention may further comprise the step of printing an active layer pattern of a diode element included in the rectenna using an ink prepared by mixing $BaTiO_3$ nanoparticles having a viscosity of 200 to 800 centipoise (cP) and a polymer urethane, or an ink prepared by mixing $BaTiO_3$ nanoparticles having a hydrophobically modified surface and butyl cellulose.

The NFC QR code label manufacturing method according to the present invention may further comprise the step of printing an active layer pattern of a p-type thin film transistor on the insulating layer printed for the p-type thin film transistor among thin film transistors included in the ring oscillator, using an ink based on Single-Walled Carbon Nanotubes (SWCNT) having 99% or more of semiconductor properties of a viscosity of 2 to 10 centipoise (cP).

The NFC QR code label manufacturing method according to the present invention may further comprise the step of printing an active layer pattern of an n-type thin film transistor on the insulating layer printed for the n-type thin film transistor among the transistors included in the ring oscillator, using an ink prepared by mixing IGZO particles having a viscosity of 200 to 1,000 centipoise (cP), polymeric styrene sulfonic acid, N,N-Dimethyl-3,4,9,10-perylenedicarboximide, and SWCNT.

According to another aspect of the present invention, there is provided an NFC QR code label manufacturing method for printing a rectenna, a ring oscillator, and a light-emitting QR code through an R2R or S2S gravure printing method, the manufacturing method comprising the steps of: printing an antenna pattern included in the rectenna on a flexible substrate; printing a lower electrode pattern including a rectenna lower electrode, a ring oscillator lower electrode, and a light-emitting QR code lower electrode on the flexible substrate; printing a QR code pattern on the QR code lower electrode using a non-conductive ink; laminating an electrophoretic sheet continuously covering the entire area of the QR code pattern while facing the lower electrode pattern on which the QR code pattern is formed; and printing an upper electrode pattern including a rectenna upper electrode and a ring oscillator upper electrode.

Advantageous Effects

According to various embodiments of the present invention, it is possible to provide an NFC QR code label that can improve reliability by providing a light-emitting QR code that flashes according to a preset frequency based on a radio signal of a terminal device or the like in order to compensate for the shortcomings of a QR code that is easy to copy or forge.

In addition, according to the present invention, since the NFC QR code label is manufactured through R2R or S2S gravure printing, it is possible to provide an NFC QR code label manufacturing method that can remarkably reduce the time and cost required for manufacturing.

BEST MODE FOR CARRYING OUT THE INVENTION

Figure 1:
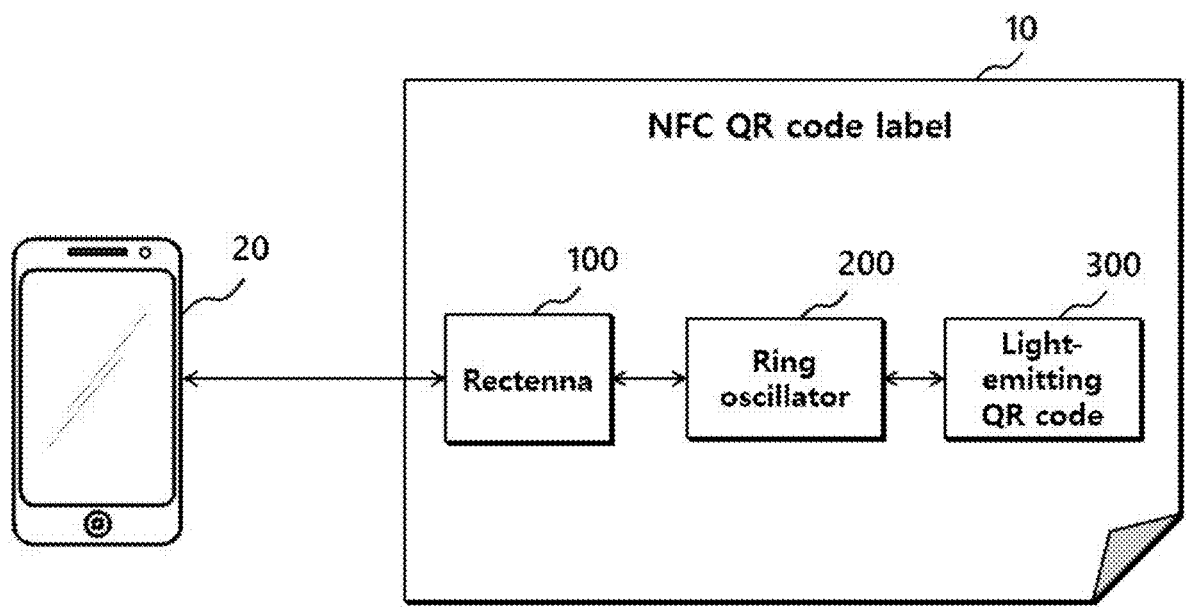
FIG. 1 is a block diagram showing an NFC QR code label according to an embodiment of the present invention.

Hereinafter, preferred embodiments of the present invention will be described in detail with reference to the accompanying drawings in order to clarify the technical spirit of the present invention. In describing the present invention, when it is determined that detailed description of a related known function or component may unnecessarily obscure the subject matter of the present invention, the detailed description thereof will be omitted. The same reference numerals and reference symbols are assigned to the constitutional components having substantially the same functional configuration in the drawings as much as possible, although they are shown in different drawings. For convenience of explanation, the devices and the methods will be described together if necessary.

FIG. 1 is a block diagram showing an NFC QR code label according to an embodiment of the present invention.

Referring to FIG. 1, an NFC QR code label 10 may include a rectenna 100, a ring oscillator 200, and a light-emitting QR code 300.

The NFC QR code label 10 receives a radio signal from the terminal device 20 through near field communication (NFC) and converts the received radio signal into DC power to generate power required for internal operation. In an embodiment, the rectenna 100 may include an antenna coil designed to receive a radio signal having a frequency of 13.56 MHz from the terminal device 20 according to NFC standards, a diode and a capacitor element for rectifying the radio signal to provide as a DC signal. The rectenna 100 may receive a radio frequency signal from the terminal device 20 and convert the radio frequency signal into DC power, and in the present invention, all circuit elements constituting the rectenna 100 may be formed in a printed electronic method.

The ring oscillator 200 is activated and operates according to the DC power received from the rectenna 100, and the ring oscillator 200 according to the present invention may generate a square wave oscillation signal of a preset frequency in response to the DC power.

According to embodiment, the ring oscillator 200 is described as having a form of a ring oscillator in which a plurality of inverters is connected in series, and the input of the first inverter is connected to the output of the last inverter. In the same manner, inverters may be implemented in various ways according to embodiments. Although it is described in the present invention that it is a CMOS inverter, which is an inverter including p-type and n-type thin film transistors connected to the same gate terminal, the present invention is not limited thereto, and the ring oscillator 200 may include inverters implemented using only p-type thin film transistors.

The oscillation signal provided from the ring oscillator 200 is provided to the light-emitting QR code 300. The light-emitting QR code 300 according to the present invention flashes according to the oscillation signal, and flashing characteristics (e.g., flashing cycle or pattern) of the light-emitting QR code 300 are determined according to the oscillation signal.

As the light-emitting QR code 300 has an electrophoretic or electrochromic characteristic while being manufactured in a printed electronic method according to the present invention, it is shown to flash in response to an oscillation signal having a voltage value between a positive electrode and a negative electrode. The configuration of the light-emitting QR code 300 will be described below.

As described above, in the present invention, the oscillation signal is generated according to the radio signal provided from the terminal device 20 to visually display a flashing QR code. As the QR code is manufactured in a printed electronic method, forgery or falsification from the outside is difficult, and the cycle or the characteristics of the oscillation signal may be used to verify authenticity of the QR code. The cycle of the oscillation signal may vary according to physical characteristics such as the size of all transistors included in the inverters constituting the ring oscillator 200, the depth or width of the source, the gate and the drain, the thickness of the active layer, or the like.

The frequency at which the QR code flashes may also act as an important factor in determining authenticity of the QR code. Since the NFC QR code label 10 according to the present invention is manufactured in a printing method, the physical characteristics of the ring oscillator 200 that can determine the characteristics of the oscillation signal may be easily adjusted. For example, the ring oscillator 200 according to the present invention may generate an oscillation signal having a frequency of 0.1 to 100 Hz.

According to embodiments, the ring oscillator 200 may be designed to generate oscillation signals of different frequencies according to the type of a product to which the NFC QR code label 10 according to the present invention is attached.

In the present invention, a user may visually read the flashing QR code through the terminal device 20, and read data related to a product, to which the QR code label is attached, based on the information included in the QR code.

For example, the QR code may include Uniform Resource Identifier (URI) information or identifier information for viewing distribution history of a corresponding product that is recorded in the blockchain.

As described above, since the NFC QR code label 10 according to the present invention is manufactured in a printed electronic method, falsification of the QR code itself is difficult, and authenticity of the QR code may be additionally determined according to the flashing frequency of the QR code. Furthermore, reliability of the information itself can be secured as access to the information recorded in the blockchain is allowed through the QR code.

Figure 2:
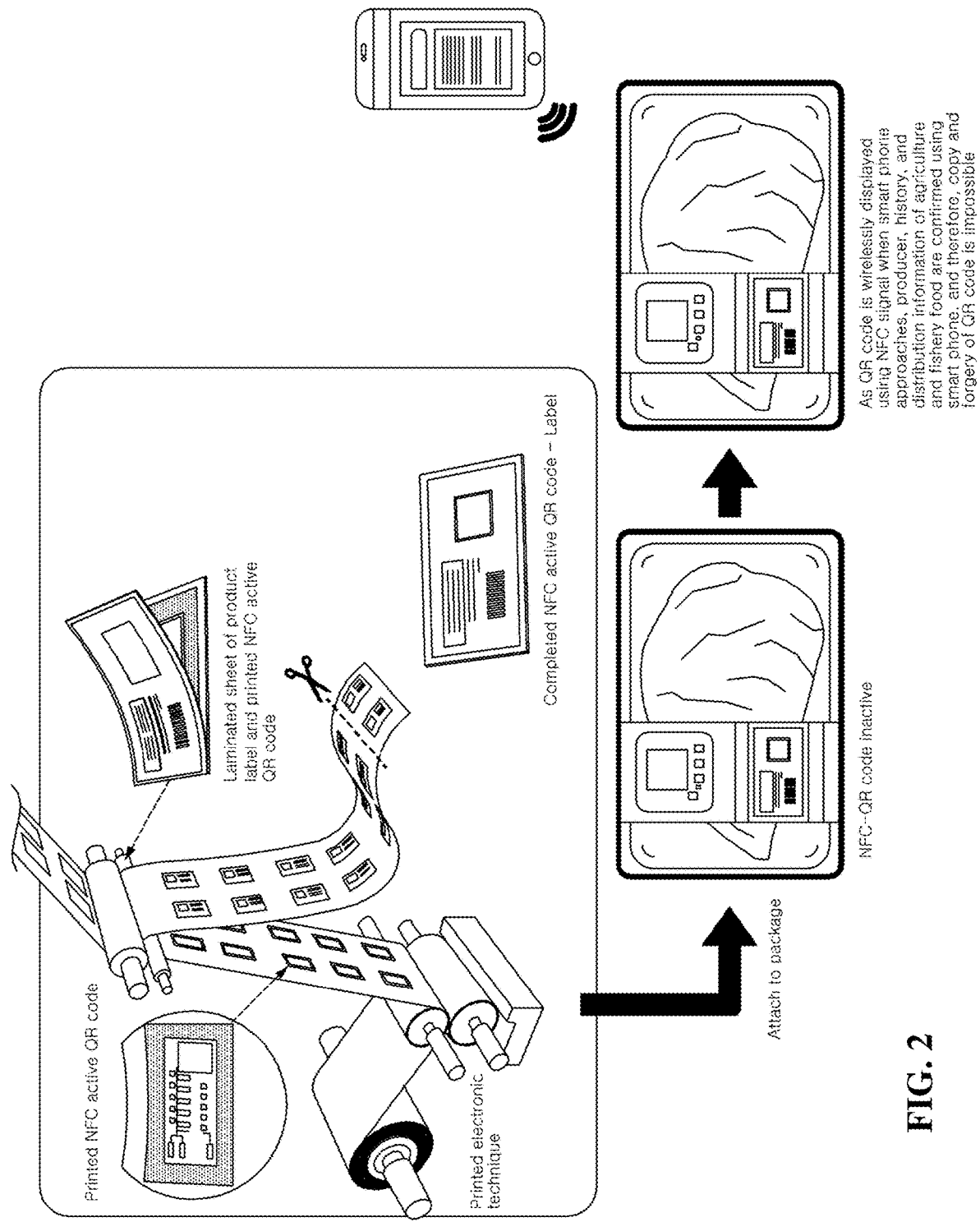
FIG. 2 is a view showing the concept of manufacturing and using an NFC QR code label according to the present invention.

FIG. 2 is a view showing the concept of manufacturing and using an NFC QR code label according to the present invention.

Referring to FIG. 2, in the present invention, the NFC QR code label is manufactured using a printed electronic technique. Although FIG. 2 shows that the NFC QR code label is manufactured through an R2R method, it is not limited thereto, and the NFC QR code label may be manufactured in an S2S method.

After laminating a product label on the top of the NFC QR code label 10, the NFC QR code label 10 is attached to a product. When a radio signal is not provided from the outside, the NFC QR code label 10 is in an inactive state. When the terminal device is near the NFC QR code label 10 (e.g., a distance less than 10 Cm capable of performing near field communication), an oscillation signal is generated from the ring oscillator 200 through an NFC signal, and as a QR code that flashes while having a preset cycle or pattern is displayed as described above, the QR code may be read through the terminal device. Accordingly, the terminal device may acquire information on the product on the basis of the information stored in the QR code.

Figure 3:
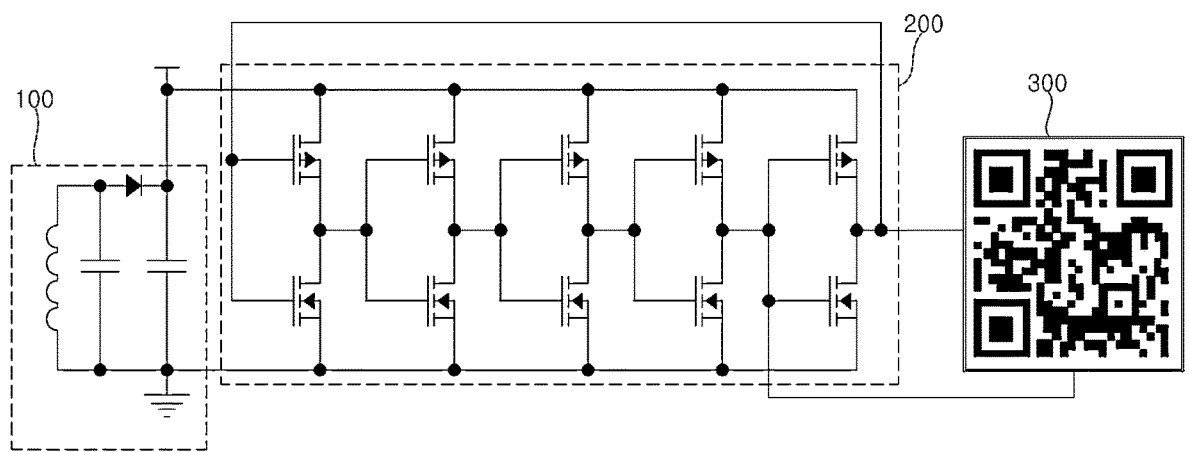
FIG. 3 is a circuit diagram showing an NFC QR code label according to an embodiment of the present invention.

FIG. 3 is a circuit diagram showing an NFC QR code label according to an embodiment of the present invention.

FIG. 3 shows an embodiment of a circuit for implementing each function of an NFC QR code label according to the present invention, and the circuit of the NFC QR code label according to the present invention is not limited to the circuit shown in FIG. 3. For convenience of explanation, in FIG. 3, it will be described using the same reference numerals as those of the components described with reference to FIG. 1.

Referring to FIG. 3, the rectenna 100 included in the NFC QR code label 10 may include an antenna coil, a diode, and capacitor elements. DC power provided from the rectenna 100 may be provided as power voltage of the ring oscillator 200, for example, provided to the source terminal of the p-type thin film transistor. Although it is described in the present invention based on the ring oscillator 200 in which five inverters including a p-type thin film transistor and an n-type thin film transistor are connected, it is not limited thereto.

The ring oscillator 200 provides a square wave oscillation signal having a preset cycle for the light-emitting QR code 300 through an oscillation operation, and the light-emitting QR code 300 flashes based on the oscillation signal as described above.

Figure 4:
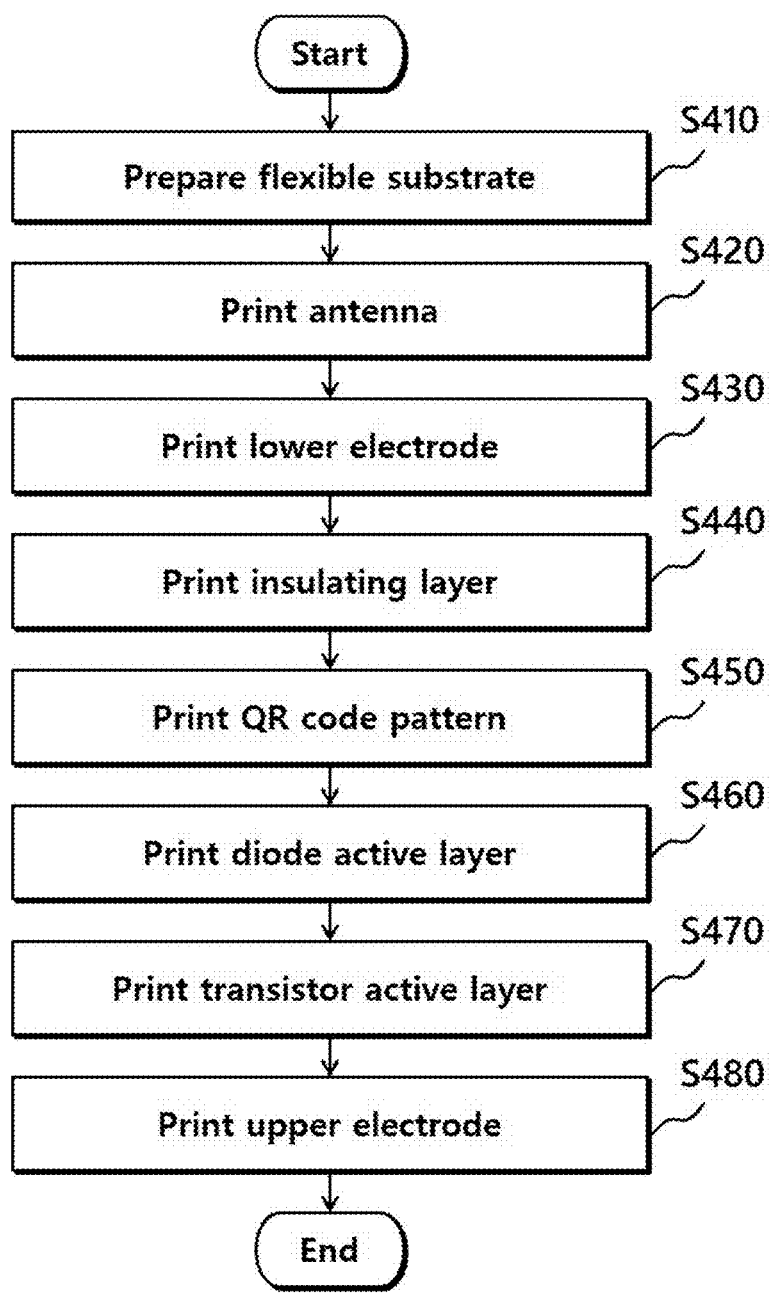
FIG. 4 is a flowchart illustrating a method of manufacturing an NFC QR code label according to an embodiment of the present invention.

FIG. 4 is a flowchart illustrating a method of manufacturing an NFC QR code label according to an embodiment of the present invention.

Referring to FIG. 4, a flexible substrate is prepared (S410), and an antenna pattern is printed (S420). The flexible substrate may be made of a plastic film such as PET, or a paper material.

The antenna pattern may be formed as a coil pattern capable of receiving NFC radio signals transferred from the terminal device 20, and printed on the flexible substrate using silver nano ink or copper ink.

In a manner similar to the antenna pattern, a lower electrode may be printed using an ink having conductivity (S430). The lower electrode may include one end electrodes of elements constituting the circuit of the NFC QR code label. Accordingly, at least one end electrode of the diode, one end electrode of the capacitor, one end electrode of the ring oscillator (e.g., the gate terminal of a transistor constituting an inverter), and one end electrode of a light-emitting QR code element may be included in the lower electrode pattern. According to embodiments, other conductive patterns may also be included in the lower electrode pattern.

In the present invention, the conductive pattern may be printed using an ink containing silver nanoparticles or copper particles having a viscosity of 300 to 800 centipoise (cP).

In addition, dielectric and insulating layer patterns working as the dielectric of the capacitor and the active layer of the transistor are printed while maintaining insulation from other conductive patterns that will be formed on the top of the lower electrode pattern according to the layout design of the circuit (S440). In the present invention, the insulating layer pattern may be printed using an ink prepared by mixing IGZO particles having a viscosity of 200 to 1,000 centipoise (cP) and polymeric styrene sulfonic acid.

A pattern of the light-emitting QR code that flashes according to the oscillation signal is printed on the QR code lower electrode (S450). The QR code pattern is a pattern having the same shape as that of a two-dimensional QR code that is generally displayed in black color. In the present invention, the QR code pattern is printed through gravure printing using a non-conductive ink containing polydimethylsiloxane (PDMS) or polyvinylidene fluoride (PVDF) having a viscosity of 800 to 1,000 centipoise (cP).

According to embodiments, the light-emitting QR code according to the present invention may be implemented in an electrochromic method or an electrophoretic method. When the light-emitting QR code is implemented in the electrochromic method, it may be formed by printing a QR code pattern on the QR code lower electrode, printing a gel electrolyte pattern having a shape inverting the QR code pattern on the same layer as that of the QR code pattern, and printing a transparent electrode continuously covering the entire QR code pattern on the gel electrolyte pattern.

The transparent electrode is a QR code upper electrode corresponding to the QR code lower electrode, and may receive the same oscillation signal as that of the QR code lower electrode.

The gel electrolyte pattern may be printed using a gel-type ink containing polyethylene glycol (PEO) having a viscosity of 800 to 1,000 centipoise (cP) and $LiClO_4$—, and the transparent electrode may be printed on the top of the QR code pattern and the gel electrolyte pattern to cover them using PEDOT having a viscosity of 800 to 1,000 centipoise (cP).

As another method, when the light-emitting QR code is implemented based on electrophoresis, the light-emitting QR code may be formed by directly laminating an electrophoretic sheet on the QR code pattern at a position facing the QR code lower electrode. In the same manner, the electrophoretic sheet may function as the QR code upper electrode. Both the QR code upper electrode and lower electrode may receive the oscillation signal.

A diode active layer pattern is printed on the diode lower electrode (S460). The diode active layer pattern may be printed using an ink prepared by mixing $BaTiO_3$ nanoparticles having a viscosity of 200 to 800 centipoise (cP) and polymer urethane. In another embodiment, the diode active layer pattern may be printed using an ink prepared by mixing $BaTiO_3$ nanoparticles, the surface of which is hydrophobically modified, and butyl cellulose.

In the present invention, printing the lower electrode pattern, the insulating layer pattern, the QR code pattern, and the diode active layer pattern is not limited to the order described above. The printing order of the patterns may be changed according to the configuration of the circuit or the layout of the configured circuit. However, components having the same characteristics may be designed and printed as a single drawing.

An active layer of the thin film transistors included in the inverters constituting the ring oscillator may be printed (S470). According to the type of the thin film transistor, the active layer of the transistors may be printed in a different method. The active layer pattern of the n-type thin film transistor may be printed using an ink prepared by mixing IGZO particles having a viscosity of 200 to 1,000 centipoise (cP), polymeric styrene sulfonic acid, N,N-Dimethyl-3,4,9,10-perylenedicarboximide, and SWCNT. The active layer pattern of the p-type thin film transistor may be printed using an ink based on Single-Walled Carbon NanoTubes (SWCNT) having 99% or more of semiconductor properties of a viscosity of 2 to 10 centipoise (cP).

Subsequently, an upper electrode pattern constituting the elements of the NFC QR code label may be printed (S480). The upper electrode pattern may be printed using the same ink as that of the lower electrode pattern. The upper electrode pattern may include at least one end electrode of the diode, one end electrode of the capacitor, and one end electrode of the ring oscillator (e.g., source and drain electrodes of a thin film transistor constituting an inverter).

The NFC QR code label may be protected by additionally printing a barrier film several times (e.g., twice) using polymer PVDF ink, and a film on which the logo of the product is printed may be laminated on the top of the circuit.

Figure 5:
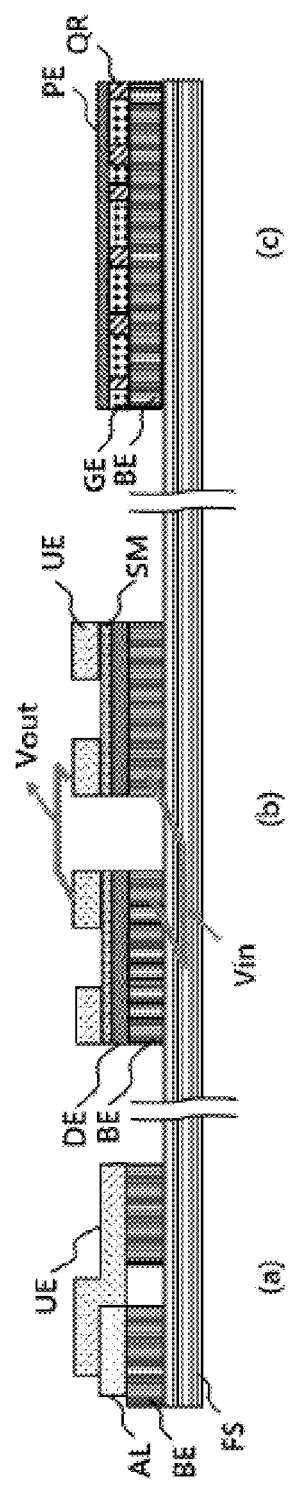
FIG. 5 is a cross-sectional view showing an embodiment of an NFC QR code label completed according to a sequential pattern printing process according to the present invention.

FIG. 5 is a cross-sectional view showing an embodiment of an NFC QR code label completed according to a sequential pattern printing process according to the present invention.

FIG. 5(a) is a view showing the cross-section of the rectenna 100, and a diode element included in the rectenna 100 and a wiring pattern connected thereto may be confirmed in the drawing. Lower electrodes BE spaced apart from each other are placed on the flexible substrate FS, and a diode active layer AL is printed on the lower electrode BE on the left side. It can be confirmed that as the diode active layer AL is connected to the lower electrode BE on the right side through the upper electrode UE, a circuit in which a diode element may be connected to another element is implemented.

FIG. 5(b) is a view showing the cross-section of the ring oscillator 200, and may show the configuration of two thin film transistors included in one inverter constituting the ring oscillator. Although it is described in FIG. 5(b) based on the configuration of thin film transistors of a bottom-gate type, it is not limited thereto.

Input voltage Vin may be provided to the lower electrode BE, i.e., the gate electrode, of each transistor. As can be confirmed with reference to the circuit diagram of FIG. 3, the input voltage Vin and the output voltage Vout may have different values depending on to which inverter of the ring oscillator a transistor belongs. An active layer DE may be printed on the lower electrode BE. As described above, the active layer DE may be printed using an ink prepared by mixing IGZO particles having insulating properties and polymer styrene sulfonic acid.

A semiconductor layer SM is formed on the insulating layer DE, and a pattern for forming the semiconductor layer SM may be printed using a different ink according to the type of the n-type thin film transistor and the p-type thin film transistor. As the upper electrode UE is printed on the semiconductor layer SM, source and drain electrodes are formed, and an inverter may be completed.

FIG. 5(c) is a view showing the cross-section of the light-emitting QR code 300. It can be confirmed that a lower electrode BE is formed on a flexible substrate FS, and a QR code pattern QR and a gel electrolyte pattern GE having patterns of complementary shapes are printed on the lower electrode BE. In addition, a transparent electrode PE may be printed on the top.

The transparent electrode PE may be formed to face the lower electrode BE and cover both the QR code pattern QR and the gel electrolyte pattern GE placed between the electrodes.

As described above, the NFC QR code label is advantageous in that it is difficult to forge as the QR code flashes at a preset frequency through an oscillation signal generated by a radio signal provided from a terminal device. In addition, since the NFC QR code label is manufactured through a printing method, the manufacturing cost is low, and the manufacturing time can be significantly improved.

Although FIG. 5(c) is a view showing the cross-section of an electrochromic-based light-emitting QR code, in the case of an electrophoresis-based light-emitting QR code, the gel electrolyte pattern GE may remain as the empty space, and an electrophoretic film may be laminated at the position where the transparent electrode PE is formed.

Figure 6:
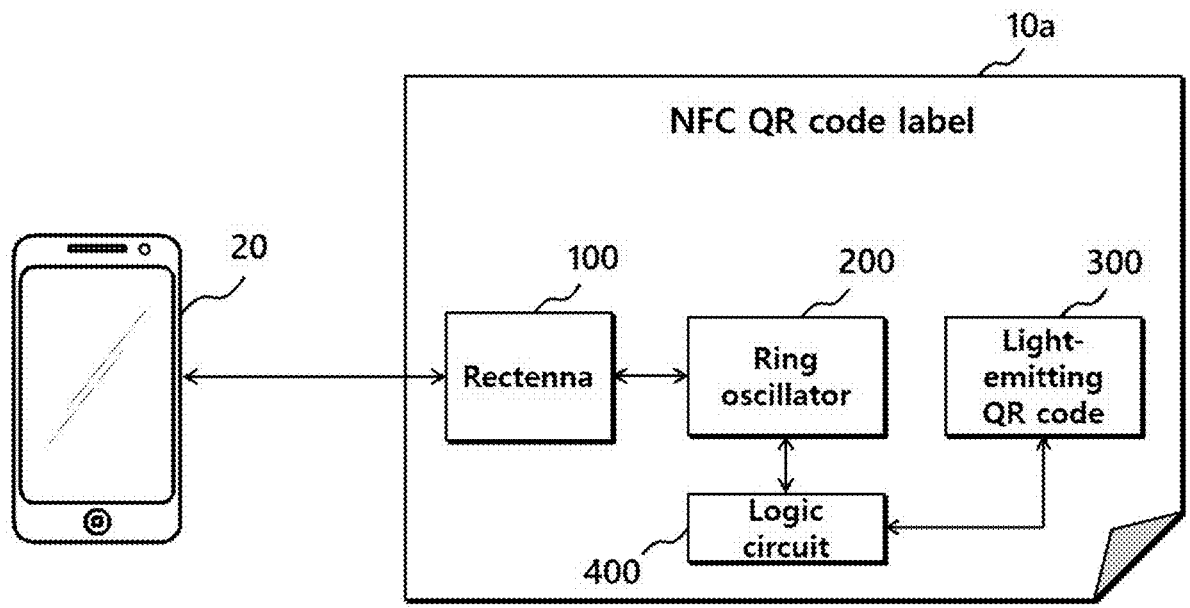
FIGS. 6 and 7 are views showing NFC QR code labels according to other embodiments of the present invention.

FIG. 6 is a view showing an NFC QR code label according to another embodiment of the present invention.

Referring to FIG. 6, the NFC QR code label 10a according to the present invention may further include a logic circuit 400 therein to additionally confirm whether or not the QR code is authentic.

The logic circuit 400 may receive an oscillation signal from the ring oscillator 200, generate a forgery and falsification prevention signal converted according to execution of a logic operation, and provide the forgery and falsification prevention signal to the light-emitting QR code 300. For example, although a square wave oscillation signal has the same value of "1 0 1 0 . . . " according to a specific frequency, as a logic operation is performed in the logic circuit 400, the light emission QR code may flash while having a different pattern. For example, the logic circuit 400 may perform the logic operation as another signal having a predetermined value is provided in addition to the oscillation signal, or perform the logic operation by considering the oscillation signal delayed as much as a preset cycle also as an input signal. The method of implementing the logic circuit 400 is not limited thereto.

For example, the logic circuit 400 may be designed to receive a square wave oscillation signal and generate a forgery and falsification prevention signal indicating a preset forgery prevention and falsification code of a plurality of bits.

Accordingly, the QR code may indicate a different code according to the logic circuit 400 while flashing according to the frequency of the oscillation signal generated by the ring oscillator 300 provided in the NFC QR code label 10. Accordingly, the terminal device 20 that has confirmed the QR code may determine whether the QR code is forged by confirming the flash cycle and the flash code of the QR code.

Meanwhile, in the present invention, there may be a restriction in that DC power is not continuously supplied for the oscillation signal generated to flash the QR code in a way that a radio signal provided from the terminal device 20 is generated for 8 ms, suspended for 2 seconds, and generated again after the break according to NFC standards. As the NFC QR code label according to the present invention is manufactured according to the printed electronic method together with the characteristic of the radio signal, the performance is lower than that of a silicon-based circuit, and therefore, it also needs to supplement the characteristic by providing a separate component in the NFC QR code label. According to embodiments, the NFC QR code label may further include a voltage multiplier circuit that increases a voltage value obtained by rectifying an AC voltage, a super capacitor that stores the converted DC power for a considerable period of time, and the like.

Figure 7:
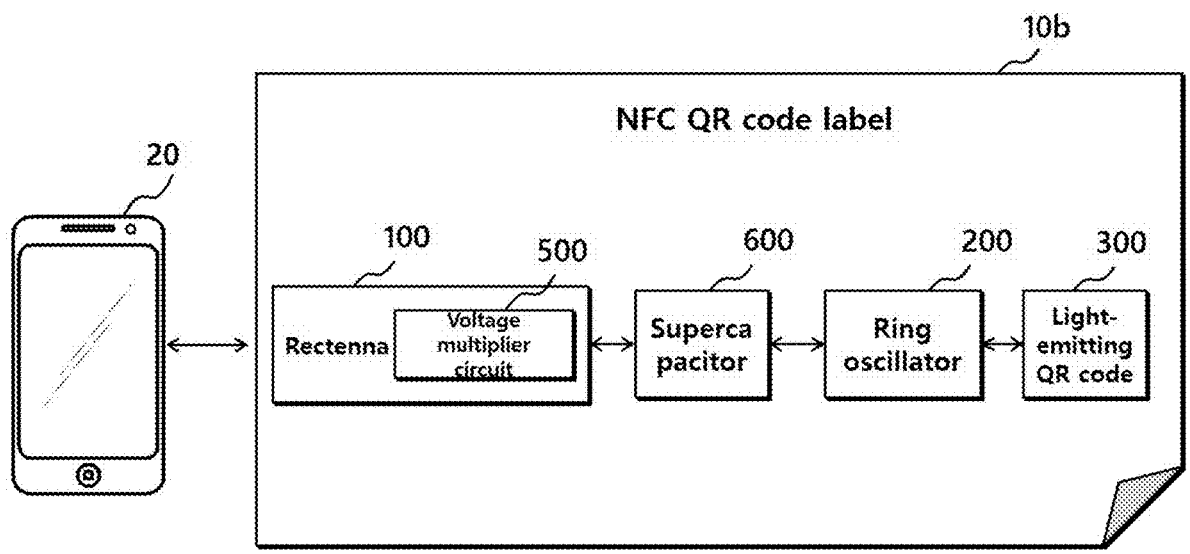

FIG. 7 is a view showing an NFC QR code label according to another embodiment of the present invention.

Referring to FIG. 7, the NFC QR code label 10b further includes a voltage multiplier circuit 500 in the rectenna 100 to increase the voltage rectified from the radio signal received from the terminal device 20 as much as a predetermined number of times. For example, the voltage multiplier circuit 500 may include a voltage doubler or a voltage tripler. Although FIG. 7 shows that the voltage multiplier circuit 500 is included in the rectenna 100, it is not limited thereto.

In addition, the NFC QR code label 10b may further include a super capacitor 600 to stably provide DC power to the ring oscillator 200 even when a radio signal is not transferred from the terminal device 20 in order to maintain power for a predetermined period of time, and capacitance of the super capacitor 600 may be designed to such an extent that the ring oscillator 200 may stably generate the oscillation signal for 2 seconds when the radio signal is not generated.

Figure 8:
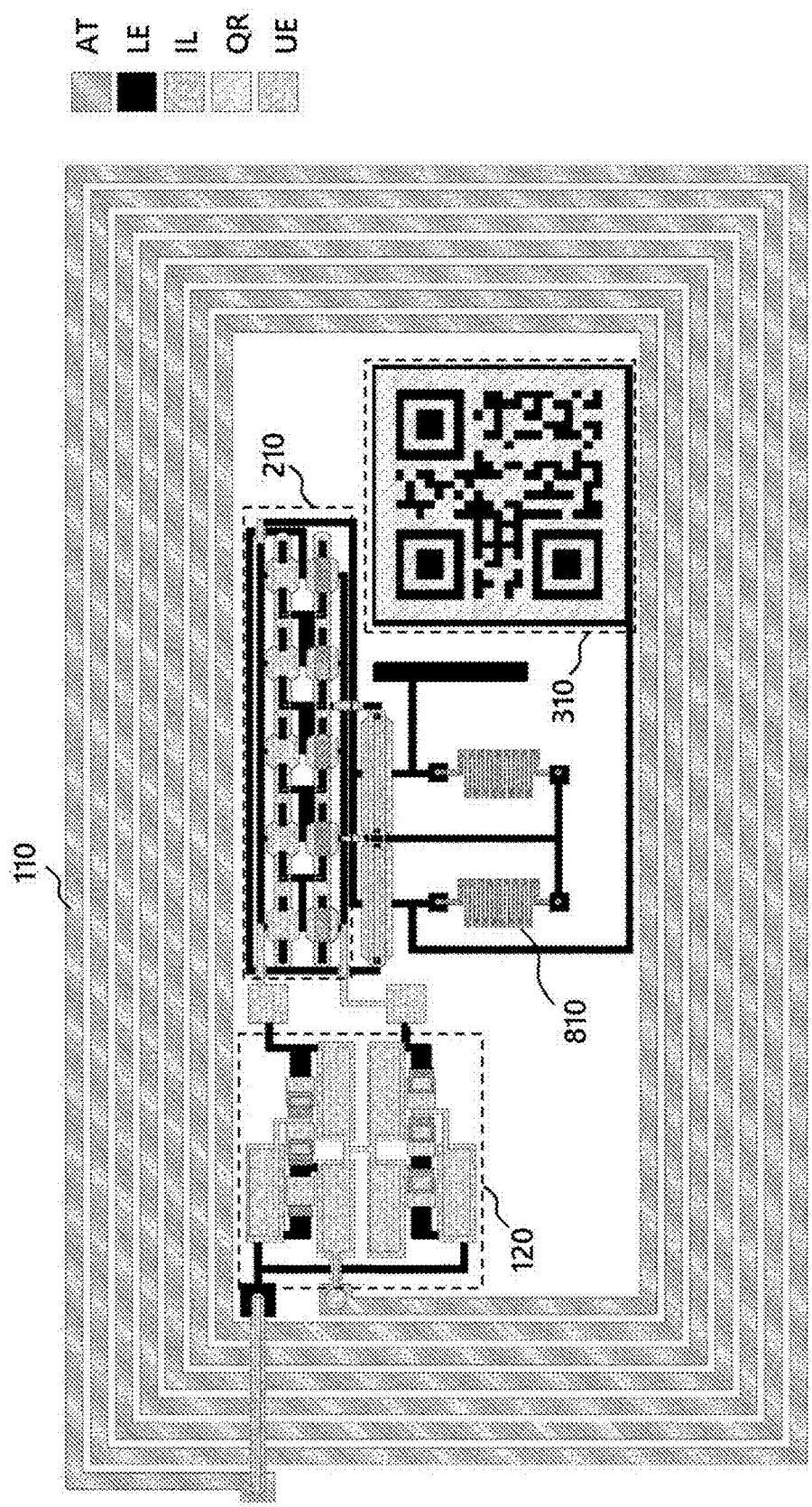
FIG. 8 is a printed view showing an NFC QR code label having the configuration as shown in FIG. 7 implemented in a printing method.

FIG. 8 is a printed view showing an NFC QR code label having the configuration as shown in FIG. 8 implemented in a printing method.

Referring to FIG. 8, the NFC QR code label may include a rectenna pattern 120 including a diode, a capacitor, and a voltage multiplier circuit connected to the outermost antenna pattern 110, a ring oscillator pattern 210 connected to the rectenna circuit, and a light-emitting QR code pattern 310 connected to the ring oscillator.

The rectenna pattern 120, the ring oscillator pattern 210, and the QR code pattern 310 are not distinguished according to a printing order, but a finally implemented circuit is separately described, and the lower electrode pattern, the insulating layer pattern, and the upper electrode pattern described above may implement all of the rectenna pattern 120, the ring oscillator pattern 210, and the QR code pattern 310.

For example, the antenna pattern AT, the lower electrode pattern LE, the upper electrode pattern UE, the insulating layer pattern IL, and the QR code pattern QR marked with different hatchings may be confirmed in FIG. 8. Additionally, a resistance buffer 810 may be additionally printed between the light-emitting QR code and the ring oscillator. The resistance buffer 810 may perform a function of stabilizing the oscillation signal provided to the QR code pattern 310.

As the NFC QR code label according to the present invention includes a rectenna, a ring oscillator, and a light-emitting QR code manufactured in a printed electronic method, specifically, a gravure printing method, forgery and falsification of a QR code can be prevented by providing a flashing QR code. Furthermore, since the NFC QR code label manufactured in the gravure printing method can be manufactured at a unit price less than 30 Korean Won, the NFC QR code label may be used in various fields using QR codes.

Until now, the present invention has been described in detail focusing on the preferred embodiments shown in the drawings. These embodiments are not intended to limit the present invention, but are merely illustrative, and should be considered from a descriptive point of view rather than a restrictive point of view. The true technical protection scope of the present invention should be determined not by the above description, but by the technical spirit of the appended claims. Although specific terms are used in this specification, they are used only for the purpose of describing the concept of the present invention, and are not used to limit the meaning or the scope of the present invention described in the claims. Each step of the present invention does not necessarily need to be performed in the order described above, and may be performed in parallel, selectively or individually. Those skilled in the art will understand that various modifications and equivalent other embodiments are possible without departing from the essential technical spirit of the present invention claimed in the claims. It should be understood that the equivalents include not only currently known equivalents, but also equivalents to be developed in the future, i.e., all components invented to perform the same function regardless of structure.

The invention claimed is:

1. An NFC QR code label comprising:
   a rectenna for receiving a radio frequency signal from a terminal device and converting the signal into DC power;
   a ring oscillator activated by receiving the DC power from the rectenna to generate an oscillation signal of a preset frequency; and
   a light-emitting QR code that flashes in response to the oscillation signal,
   wherein the light-emitting QR code comprises a QR code pattern formed by gravure printing using a non-conductive ink, and
   wherein the oscillation signal has a voltage value between a positive electrode and a negative electrode.

2. The NFC QR code label according to claim 1, wherein the light-emitting QR code further includes:
   a lower electrode positioned under the QR code pattern to receive the oscillation signal; and
   an electrophoretic sheet positioned on the QR code pattern in an area facing the QR code lower electrode to receive the oscillation signal.

3. The NFC QR code label according to claim 2, further comprising a logic circuit for generating a forgery and falsification prevention signal by performing a preset logic operation on the oscillation signal received from the ring oscillator, and providing the forgery and falsification prevention signal to the light-emitting QR code.

4. The NFC QR code label according to claim 2, wherein the non-conductive ink includes a PDMS or PVDF ink having a viscosity of 800 to 1,000 centipoise (cP).

5. The NFC QR code label according to claim 1, An NFC QR code label comprising:
   a rectenna for receiving a radio frequency signal from a terminal device and converting the signal into DC power;
   a ring oscillator activated by receiving the DC power from the rectenna to generate an oscillation signal of a preset frequency; and
   a light-emitting QR code that flashes in response to the oscillation signal,
   wherein the light-emitting QR code comprises:
   a QR code pattern formed by gravure printing using a non-conductive ink;
   a lower electrode positioned under the QR code pattern to receive the oscillation signal;
   a transparent upper electrode positioned on the QR code pattern to receive the oscillation signal; and
   a gel electrolyte that fills gaps in the QR code pattern in the same layer as that of the QR code pattern.

6. The NFC QR code label according to claim 5, further comprising a logic circuit for generating a forgery and falsification prevention signal by performing a preset logic operation on the oscillation signal received from the ring oscillator, and providing the forgery and falsification prevention signal to the light-emitting QR code.

7. The NFC QR code label according to claim 5, wherein the non-conductive ink includes a PDMS or PVDF ink having a viscosity of 800 to 1,000 centipoise (cP).

8. An NFC QR code label manufacturing method for printing a rectenna, a ring oscillator, and a light-emitting QR code through an R2R or S2S gravure printing method, the manufacturing method comprising the steps of:
   printing an antenna pattern included in the rectenna on a flexible substrate;
   printing a lower electrode pattern including a rectenna lower electrode, a ring oscillator lower electrode, and a QR code lower electrode on the flexible substrate;
   printing a QR code pattern on the QR code lower electrode using a non-conductive ink;
   printing a transparent electrode continuously covering the entire QR code pattern; and
   printing an upper electrode pattern including a rectenna upper electrode and a ring oscillator upper electrode.

9. The method according to claim 8, wherein the non-conductive ink used to print the QR code pattern includes PDMS or PVDF ink having a viscosity of 800 to 1,000 centipoise (cP).

10. The method according to claim 9, further comprising the step of printing a gel electrolyte pattern of an inverse shape of the QR code pattern using a gel-type ink made of PEO having a viscosity of 800 to 1,000 centipoise (cP) and LiClO4-.

11. The method according to claim 10, wherein the step of printing a lower electrode pattern includes the step of printing the lower electrode pattern using an electronic ink based on silver nanoparticles or copper particles having a viscosity of 300 to 800 centipoise (cP).

12. The method according to claim 10, further comprising the step of printing a dielectric layer of a capacitor included in the rectenna and an insulating layer pattern included in transistors included in the ring oscillator using an ink prepared by mixing IGZO particles having a viscosity of 200 to 1,000 centipoise (cP) and polymeric styrene sulfonic acid.

13. The method according to claim 12, further comprising the step of printing an active layer pattern of a diode element included in the rectenna using an ink prepared by mixing BaTiO3 nanoparticles having a viscosity of 200 to 800 centipoise (cP) and a polymer urethane, or an ink prepared by mixing BaTiO3 nanoparticles having a hydrophobically modified surface and butyl cellulose.

14. The method according to claim 13, further comprising the step of printing an active layer pattern of a p-type thin film transistor on the insulating layer printed for the p-type thin film transistor among thin film transistors included in the ring oscillator, using an ink based on Single-Walled Carbon Nanotubes (SWCNT) having 99% or more of semiconductor properties of a viscosity of 2 to 10 centipoise (cP).

15. The method according to claim 14, further comprising the step of printing an active layer pattern of an n-type thin film transistor on the insulating layer printed for the n-type thin film transistor among the thin film transistors included in the ring oscillator, using an ink prepared by mixing IGZO particles having a viscosity of 200 to 1,000 centipoise (cP), polymeric styrene sulfonic acid, N, N-Dimethyl-3, 4, 9, 10-perylenedicarboximide, and SWCNT.

16. An NFC QR code label manufacturing method for printing a rectenna, a ring oscillator, and a light-emitting QR code through an R2R or S2S gravure printing method, the manufacturing method comprising the steps of:
   printing an antenna pattern included in the rectenna on a flexible substrate;
   printing a lower electrode pattern including a rectenna lower electrode, a ring oscillator lower electrode, and a light-emitting QR code lower electrode on the flexible substrate;
   printing a QR code pattern on the QR code lower electrode using a non-conductive ink;

laminating an electrophoretic sheet continuously covering the entire area of the QR code pattern while facing the lower electrode pattern on which the QR code pattern is formed; and printing an upper electrode pattern including a rectenna upper electrode and a ring oscillator upper electrode.

\* \* \* \* \*